United States Patent
Liu et al.

(10) Patent No.: US 9,582,109 B2
(45) Date of Patent: Feb. 28, 2017

(54) METHOD FOR DETECTING TOUCH PANEL NOISE AND PERFORMING SIGNAL CONTROL AND ASSOCIATED CONTROLLER

(71) Applicant: HIMAX TECHNOLOGIES LIMITED, Tainan (TW)

(72) Inventors: Li-Lin Liu, Tainan (TW); Chung-Wen Chang, Tainan (TW); Shen-Feng Tai, Tainan (TW); Jui-Min Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 371 days.

(21) Appl. No.: 14/042,697

(22) Filed: Sep. 30, 2013

(65) Prior Publication Data
US 2015/0091814 A1 Apr. 2, 2015

(51) Int. Cl.
*G06F 3/041* (2006.01)
*G06F 3/043* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ........... G06F 3/041; G06F 3/043; G06F 3/044
USPC ....................................................... 345/173
See application file for complete search history.

(56) References Cited

U.S. PATENT DOCUMENTS

| | | | | |
|---|---|---|---|---|
| 2006/0100817 A1* | 5/2006 | You | ..................... | G01C 22/006 702/141 |
| 2006/0152441 A1* | 7/2006 | Baek | ..................... | G09G 3/2022 345/60 |
| 2006/0227037 A1* | 10/2006 | Ando | ..................... | G01S 7/4017 342/70 |
| 2007/0223835 A1* | 9/2007 | Yamada | ............... | H04N 19/176 382/268 |
| 2007/0257890 A1 | 11/2007 | Hotelling | | |
| 2009/0067854 A1* | 3/2009 | Yokogawa | ......... | H04B 10/1141 398/202 |
| 2012/0177160 A1* | 7/2012 | Abe | ........................ | H04L 7/044 375/362 |
| 2013/0027333 A1* | 1/2013 | Nagata | .................... | G06F 3/044 345/173 |
| 2013/0120309 A1 | 5/2013 | Mo | | |

(Continued)

FOREIGN PATENT DOCUMENTS

| | | |
|---|---|---|
| TW | 201100815 | 1/2011 |
| TW | 201248482 | 12/2012 |

(Continued)

*Primary Examiner* — Temesghen Ghebretinsae
*Assistant Examiner* — Paras D Karki
(74) *Attorney, Agent, or Firm* — Winston Hsu; Scott Margo

(57) ABSTRACT

A method for detecting noise of a touch panel and performing signal control is provided, where the method may determine how many cycles of frame data are influenced by noise, may determine whether the frame data is influenced by noise by determining whether a number of cycles influenced by noise is greater than a first threshold value or not, and may determine whether a number of continuous frame data determined to be influenced by noise is greater than a second threshold value to generate a determination result. Finally, the method may determine whether to adjust a frequency of the transmitting signals according to the determination result.

6 Claims, 3 Drawing Sheets

(56) References Cited

U.S. PATENT DOCUMENTS

2013/0293511 A1* 11/2013 Nam .................. G06F 3/0418
                                                      345/174
2014/0098032 A1*  4/2014 Ng ................... G06F 3/0418
                                                      345/173

FOREIGN PATENT DOCUMENTS

TW        201248483       12/2012
TW        201310320        3/2013

* cited by examiner

| | | | | | | | | | | | |
|---|---|---|---|---|---|---|---|---|---|---|---|
| 1 | 1 | 1 | 1 | 1 | 1 | 1 | 1 | 1 | 1 | 1 | ← Cycle 1 |
| 0 | 1 | 0 | 0 | 1 | 1 | 0 | 1 | 1 | 0 | 0 | |
| 1 | 2 | 2 | 2 | 1 | 3 | 2 | 3 | 3 | 2 | 2 | ⋮ |
| 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | |
| 0 | 0 | 0 | 0 | 0 | 0 | 0 | 2 | 2 | 1 | 2 | |
| 4 | 5 | 4 | 5 | 4 | 4 | 4 | 5 | 4 | 4 | 5 | ← Cycle 7 |
| 4 | 4 | 5 | 4 | 5 | 5 | 4 | 5 | 4 | 4 | 5 | ← Cycle 8 |
| 0 | 2 | 0 | 1 | 0 | 1 | 1 | 1 | 1 | 1 | 1 | |
| 0 | 0 | 0 | 0 | 0 | 0 | 0 | 0 | 0 | 0 | 0 | |
| 0 | 1 | 0 | 0 | 1 | 1 | 0 | 1 | 1 | 0 | 0 | |
| 0 | 0 | 0 | 0 | 0 | 0 | 0 | 0 | 0 | 0 | 0 | |
| 2 | 2 | 1 | 3 | 1 | 3 | 2 | 3 | 2 | 3 | 3 | ⋮ |
| 3 | 3 | 2 | 3 | 2 | 3 | 3 | 3 | 2 | 2 | 2 | |
| 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | ← Cycle 19 |
| ↑ | ↑ | | ........ | | | | | | ↑ | ↑ | |
| R1 | R2 | | | | | | | | R10 | R11 | |

FIG. 2

METHOD FOR DETECTING TOUCH PANEL NOISE AND PERFORMING SIGNAL CONTROL AND ASSOCIATED CONTROLLER

BACKGROUND OF THE INVENTION

1. Field of the Invention

The present invention relates to a touch panel, and more particularly, to a method for accurately detecting touch panel noise and performing signal control.

2. Description of the Prior Art

Current production requirements of a capacitive touch panel have strict tests for accuracy and jitter. Designers are encouraged to raise a signal to noise ratio (SNR) to satisfy these requirements, where the SNR can be improved by increasing the signals or by decreasing the noise. In a touch controller of the capacitive touch panel, the main noise comes from elements outside the panel such as the liquid crystal module (LCM), power source and light source. How to accurately detect and lower the noise becomes very important.

SUMMARY OF THE INVENTION

It is therefore an objective of the present invention to provide a method for detecting touch panel noise and performing signal control, and an associated controller, which can use a simple algorithm to accurately detect and efficiently lower the noise of the touch panel.

According to one embodiment of the present invention, a method for detecting touch panel noise and performing signal control is provided, wherein the touch panel comprises a plurality of sensing lines and a plurality of driving lines, and the sensing lines and the driving lines are intersected, and the method comprises: (a) sequentially transmitting a plurality of transmitting signals to the driving lines of the touch panel, respectively; (b) receiving data of a plurality of cycles, where data of one cycle is digital data of a plurality of receiving signals from the sensing lines when one transmitting signal is enabled and inputted into its corresponding driving line, and the data of the plurality of cycles form one frame data of the touch panel; (c) determining how many cycles are influenced by noise; (d) determining whether the frame data is influenced by noise by determining whether a number of cycles influenced by noise is greater than a first threshold value or not, where when the number of cycles influenced by noise is greater than the first threshold value, the frame data is determined to be influenced by noise; (e) repeating steps (a)-(d) to determine whether a number of continuous frame data determined to be influenced by noise is greater than a second threshold value to generate a determination result; and (f) adjusting a frequency of the transmitting signals according to the determination result.

According to another embodiment of the present invention, a controller of a touch panel is provided, where the touch panel comprises a plurality of sensing lines and a plurality of driving lines, and the sensing lines and the driving lines are intersected, and the controller comprises a micro-processor and a program code stored in a storage device of the controller. When the program code is executed by the micro-processor, the program code executes the following steps: (a) sequentially transmitting a plurality of transmitting signals to the driving lines of the touch panel, respectively; (b) receiving data of a plurality of cycles, where data of one cycle is digital data of a plurality of receiving signals from the sensing lines when one transmitting signal is enabled and inputted into its corresponding driving line, and the data of the plurality of cycles form one frame data of the touch panel; (c) determining how many cycles are influenced by noise; (d) determining whether the frame data is influenced by noise by determining whether a number of cycles influenced by noise is greater than a first threshold value or not, where when the number of cycles influenced by noise is greater than the first threshold value, the frame data is determined to be influenced by noise; (e) repeating steps (a)-(d) to determine whether a number of continuous frame data determined to be influenced by noise is greater than a second threshold value to generate a determination result; and (f) adjusting a frequency of the transmitting signals according to the determination result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is an example of a plurality of cycles of data of the receiving signals R1-R11 corresponding to the transmitting signals T1-T19.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
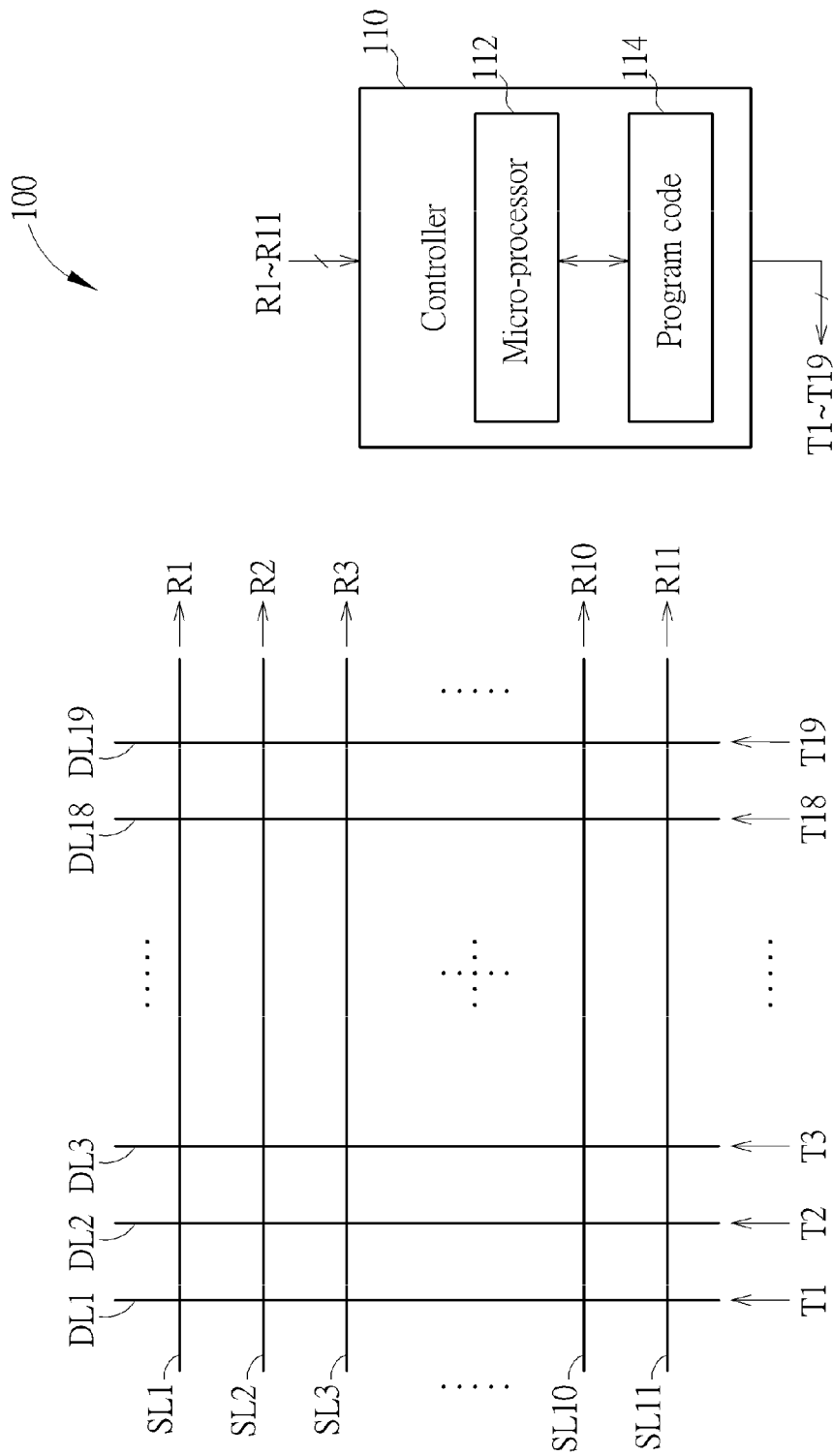
FIG. 1 is a diagram illustrating a touch panel according to one embodiment of the present invention.

Please refer to FIG. 1, which illustrates a touch panel 100 according to one embodiment of the present invention. In this embodiment, the touch panel 100 is a capacitive touch panel, and the touch panel 100 includes a plurality of driving lines and a plurality of sensing lines (in this embodiment there are nineteen driving lines DL1-DL19 and eleven sensing lines SL1-SL11) and a controller 110, where the controller 110 includes a micro-processor 112 and a program code 114 stored in a storage device of the controller 110. The driving lines DL1-DL19 and the sensing lines SL1-SL11 are intersected to form an array, the controller 110 sequentially transmits a plurality of transmitting signals T1-T19 into the driving lines DL1-DL19 (the enabling periods of the transmitting signals T1-T19 are not overlapped), respectively, and during each of the enabling periods of the transmitting signals T1-T19, the controller 110 receives a plurality of receiving signals R1-R11 from the sensing lines SL1-SL11 to determine whether one or more touch points are on the touch panel 100 or not.

Please refer to FIG. 2, which is an example of a plurality of cycles of data of the receiving signals R1-R11 corresponding to the transmitting signals T1-T19. The data shown in FIG. 2 is digital data: analog-to-digital converters (not shown) which are built in the controller 110 convert the analog receiving signals R1-R11 into digital data. As shown in FIG. 2, when the transmitting signal T1 is enabled and inputted into the driving line DL1, the controller 100 receives the receiving signals R1-R11 to generate data of cycle 1; then the transmitting signal T2 is enabled and inputted into the driving line DL2, the controller 100 receives the receiving signals R1-R11 to generate data of cycle 2, . . . and so on. The whole data (data of the cycles 1-19) shown in FIG. 2 is frame data, and this frame data corresponds to a plurality of intersection regions of the driving lines DL1-DL19 and the sensing lines SL1-SL11. The data shown in FIG. 2 can be used to determine whether one or more touch points is/are applied on the touch panel 100, and to determine the position(s) of the touch point(s).

Ideally, when there is no touch point on the touch panel 100, the data shown in FIG. 2 should be "0"; and when there is a touch point on the touch panel 100, the value of its corresponding data shown in FIG. 2 should be large (e.g. 50-250). Because of noise caused by the LCM, power source and/or light source, however, even when there is no touch point on the touch panel 100, the data shown in FIG. 2 will not all be equal to "0".

Figure 3:
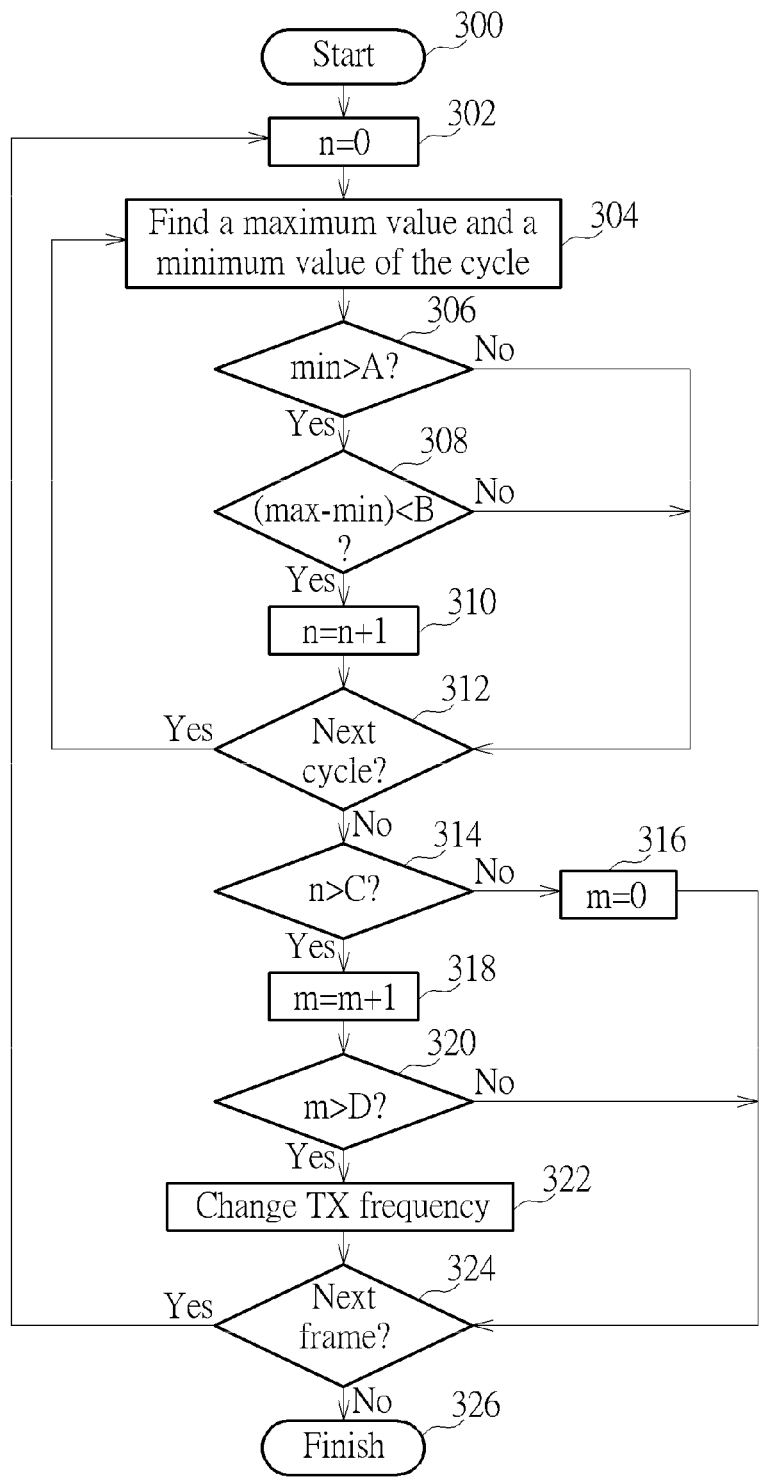
FIG. 3 is a flowchart of a method for accurately detecting touch panel noise and performing signal control according to one embodiment of the present invention.

Please refer to FIG. 3, which is a flowchart of a method for accurately detecting noise of the touch panel 100 and performing signal control according to one embodiment of the present invention. The flow shown in FIG. 3 is executed by using the micro-processor 112 to execute the program code 114. Referring to FIG. 3, the flow is described as follows.

In Step 300, the flow starts. In Step 302, a parameter n is set to be "0". In Step 304, for a current cycle (e.g. cycle 1 shown in FIG. 2), a maximum value and a minimum value of the cycle are found. In Step 306, it is determined whether the minimum value is greater than a threshold value A or not (in this embodiment, A can be 3 or 4): if the minimum value is greater than A, the flow enters Step 308; otherwise, the flow enters Step 312. In Step 308, it is determined whether a difference between the maximum value and the minimum value is less than a threshold value B or not (in this embodiment, B can be 10): if the difference is less than B, the flow enters Step 310; otherwise, the flow enters Step 312. In Step 310, the value of the parameter n is increased by an increment of 1. In Step 312, it is determined whether a next cycle exists: if the next cycle exists, the flow goes back to Step 304; otherwise, the flow enters Step 314.

The above-mentioned Steps 302-312 are used to determine how many cycles in the frame data are influenced by noise, and the parameter n is a number of cycles influenced by the noise. Taking the frame data shown in FIG. 2 as an example and assuming that A is equal to 3 and B is equal to 10, only cycle 7 and cycle 8 are determined to be influenced by the noise (minimum value is greater than 3 and the difference is less than 10), and the parameter n is equal to "2".

In Step 314, it is determined whether the parameter n is greater than a threshold value C or not (in this embodiment, C can be 2). If the parameter n is greater than a threshold value C, the flow enters Step 318 and the value of a parameter m is increased by an increment of 1 (initially, the parameter m is set to be "0"); otherwise, the flow enters Step 316 to set the parameter m to be "0". In Step 320, it is determined whether the parameter m is greater than a threshold value D or not (in this embodiment, D can be 1 or 2): if the parameter m is greater than D, the flow enters Step 322 to slightly change a frequency of the transmitting signals T1-T19 (without influencing the normal operations of the touch panel 100); otherwise, the flow enters Step 324. In Step 324, it is determined whether a next frame exists: if the next frame exists, the flow goes back to Step 302; otherwise, the flow enters Step 326 to finish the operations.

The above-mentioned Steps 314-324 are used to determine whether the current frame is influenced by noise, and to determine how many continuous frames are influenced by noise, and the parameter m is used to represent a number of continuous frames influenced by noise. Assuming that C is equal to 2, the frame is determined to be influenced by noise only when a number of cycles influenced by noise (i.e. the parameter n) is greater than 2. Taking FIG. 2 as an example, because only two cycles are determined to be influenced by noise, the frame shown in FIG. 2 is determined to not be influenced by noise. In addition, assuming that D is equal to 1, when two or more frames are determined to be influenced by noise, the controller 110 will slightly change a frequency of the transmitting signals T1-T19; otherwise, the frequency of the transmitting signals T1-T19 is not changed.

The flow shown in FIG. 3 is executed during the whole operation period of the touch panel 100. The controller 110 detects the noise of the touch panel 100 and performs signal control in a real-time manner.

To discuss the flow shown in FIG. 3, the method shown in FIG. 3 uses four conditions to check/detect whether or not to change the frequency of the transmitting signals T1-T19 for lowering the noise:

Condition 1: at one cycle, the minimum value is greater than A;

Condition 2: at one cycle, the difference value between the maximum value and the minimum value is less than B;

Condition 3: at one frame, n cycles satisfy Condition 1 and Condition 2, where n is greater than C.

Condition 4: m continuous frames satisfy Condition 3, where m is greater than D.

If Condition 4 is satisfied, the controller 110 slightly changes the frequency of the transmitting signals T1-T19 to lower the noise of the touch panel.

The Steps 306 and 308 and the above-mentioned Condition 1 and Condition 2 are for illustrative purposes only. In other embodiments, other methods or criteria can also be used to determine whether the cycle is influenced by noise.

Briefly summarized, in the method for detecting touch panel noise and performing signal control, noise can be accurately detected by using a simple algorithm, and the noise can be lowered by simply changing the frequency of the transmitting signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting noise of a touch panel and performing signal control, wherein the touch panel comprises a plurality of sensing lines and a plurality of driving lines, and the sensing lines and the driving lines are intersected, and the method comprises:

a first step sequentially transmitting a plurality of transmitting signals to the driving lines of the touch panel, respectively;

a second step for receiving data of a plurality of cycles, where data of one cycle is digital data of a plurality of receiving signals from the sensing lines when one transmitting signal is enabled and inputted into its corresponding driving line, and the data of the plurality of cycles form one frame data of the touch panel;

a third step for determining how many cycles are influenced by noise for each cycle by determining a maximum value and a minimum value of the received data among the cycle; and determining whether the cycle is influenced by noise according to the maximum value and the minimum value of the cycle;

a fourth step for determining whether the frame data is influenced by noise by determining whether a number of cycles influenced by noise is greater than a first threshold value or not, where when the number of cycles influenced by noise is greater than the first threshold value, the frame data is determined to be influenced by noise;

a fifth step for repeating the first to fourth steps to determine whether a number of continuous frame data determined to be influenced by noise is greater than a second threshold value to generate a determination result; and a sixth step for adjusting a frequency of the transmitting signals according to the determination result; wherein the first step to the sixth step are performed sequentially.

2. The method of claim 1, wherein in the third step, determining whether the cycle is influenced by noise according to the maximum value and the minimum value of the cycle comprises:

determining whether the minimum value is greater than a third threshold value or not;

determining whether a difference value between the maximum value and the minimum value is less than a fourth threshold value or not;

when the minimum value is greater than the third threshold value and the difference value is less than the fourth threshold value, determining that the cycle is influenced by noise; and when the minimum value is not greater than the third threshold value or the difference value is not less than the fourth threshold value, determining that the cycle is not influenced by noise.

3. The method of claim 1, wherein the second threshold value is equal to 1 or 2.

4. A controller of a touch panel, wherein the touch panel comprises a plurality of sensing lines and a plurality of driving lines, and the sensing lines and the driving lines are intersected, and the controller comprises a micro-processor; and a program code stored in a storage device of the controller;

when the program code is executed by the micro-processor, the program code executes the following steps:

a first step for sequentially transmitting a plurality of transmitting signals to the driving lines of the touch panel, respectively;

a second step for receiving data of a plurality of cycles, where data of one cycle is digital data of a plurality of receiving signals from the sensing lines when one transmitting signal is enabled and inputted into its corresponding driving line, and the data of the plurality of cycles form one frame data of the touch panel;

a third step for determining how many cycles are influenced by noise for each cycle by determining a maximum value and a minimum value of the received data among the cycle; and determining whether the cycle is influenced by noise according to the maximum value and the minimum value of the cycle;

a fourth step for determining whether the frame data is influenced by noise by determining whether a number of cycles influenced by noise is greater than a first threshold value or not, where when the number of cycles influenced by noise is greater than the first threshold value, the frame data is determined to be influenced by noise;

a fifth step for repeating the first to fourth steps to determine whether a number of continuous frame data determined to be influenced by noise is greater than a second threshold value to generate a determination result; and a sixth step for adjusting a frequency of the transmitting signals according to the determination result; wherein the first step to the sixth step are performed sequentially.

5. The controller of claim 4, wherein in the third step, determining whether the cycle is influenced by noise according to the maximum value and the minimum value of the cycle comprises:

determining whether the minimum value is greater than a third threshold value or not;

determining whether a difference value between the maximum value and the minimum value is less than a fourth threshold value or not;

when the minimum value is greater than the third threshold value and the difference value is less than the fourth threshold value, determining that the cycle is influenced by noise; and when the minimum value is not greater than the third threshold value or the difference value is not less than the fourth threshold value, determining that the cycle is not influenced by noise.

6. The controller of claim 4, wherein the second threshold value is equal to 1 or 2.

* * * * *